United States Patent Office 3,743,717
Patented July 3, 1973

3,743,717
PROCESS FOR MANUFACTURING ANTIPERSPIRANT
Kunikatsu Okano, 455-4 Kojiya-cho, Adachi-ku, Tokyo, Japan
No Drawing. Continuation-in-part of abandoned application Ser. No. 696,505, Jan. 9, 1968. This application Dec. 14, 1970, Ser. No. 98,034
Claims priority, application Japan, Aug. 10, 1967, 42/51,430
Int. Cl. A61k 7/00
U.S. Cl. 424—65
3 Claims

ABSTRACT OF THE DISCLOSURE

A process for manufacturing an antiperspirant, comprising boiling a mixture of 1 to 2 parts by weight of well-dried Arabian jasmine, about 20 to 40 parts by weight of beverage tea leaves and about 10 to 20 parts by weight of seed of Chinese pepper with a liquid selected from the group consisting of water and ether for about 15 minutes to about one hour to obtain an extract liquor in a quantity of about 600 to 700 parts by weight, filtering the extract liquor to obtain a filtrate, adding to said filtrate an organic acid selected from the group consisting of about 8 to 12 parts by weight of citric acid, about 3.5 to 4.5 parts by weight of succinic acid and about 3 to 4 parts by weight of tartaric acid, and adding to said filtrate about 15 to 20 parts by weight of lemon juice.

---

This application is a continuation-in-part of my co-pending application Ser. No. 696,505, filed Jan. 9, 1968, now abandoned.

This invention relates to a process for manufacturing an antiperspirant which has a sufficient durability of efficacy and may be manufactured at a reduced cost.

Perspiration regulates body temperature and is more abundant at a high temperature during the summer season to keep the said body temperature at a normal temperature. The sweat at the armpit, hands and feet where the perspiration is more particularly active than the other parts in the human body not only soils the clothes but also emits an offensive odor and gives offense to others.

Lately various tests have been made to locally suppress the perspiration at the armpit, hands and feet and, as a result, various means and cosmetics are commercially available at present.

However, the conventionally available products are all deficient in the durability of efficacy and any sufficient effect is not obtained.

It is thus a principal object of the invention to obviate the above disadvantage and to provide a new process for manufacturing an antiperspirant having the ability to locally suppress the perspiration in the human body.

It is another object of this invention to provide a new process for manufacturing an antiperspirant having the sufficient durability of efficacy, which may be manufactured at the reduced cost.

In one embodiment of this invention, a mixture of flowers of Arabian jasmine, beverage tea leaves and seed of Chinese pepper is boiled with water to obtain an extract thereof and the resulting extract is added with one or more organic acids selected from the group consisting of citric acid, succinic acid and tartaric acid, and with lemon juice.

In another embodiment of this invention, a mixture of flowers of Arabian jasmine, beverage tea leaves and seed of Chinese pepper is boiled with ether until the said ether is completely evaporated thereby obtaining a residue, which is then added with alcohol and filtered. The thus-treated material is finally added with one or more organic acids selected from the group consisting of citric acid, succinic acid and tartaric acid, and with lemon juice.

In a further embodiment of this invention, a mixture of flowers of Arabian jasmine, beverage tea leaves and seed of Chinese pepper is circulated through a reflux condenser, and after filtration, diluted with alcohol. The resulting mixture is then added with one or more organic acids selected from the group consisting of citric acid, succinic acid and tartaric acid, and with lemon juice.

Without limiting this invention, the following examples are given to illustrate possible preferred modes of operation.

In the operation, 1-2 parts by weight of well-dried flowers of Arabian jasmine (*Jasminum sambac* Soland), 20-40 parts by weight of Chinese tea leaves, for example green tea or black tea, and 10-20 parts by weight of seed of Chinese pepper are mixed with stirring and subsequently immersed in approximately 1000 parts by weight of water or hot water to permit boiling until the said water is reduced to approximately ⅔ times its original volume, i.e. to 600-700 parts by weight, thereby extracting an active ingredient of said mixture sufficiently.

The extraction may be carried out in a container provided with a reflux condenser by boiling with approximately 600-700 parts by weight of water for from fifteen minutes to one hour. Although the water volume may be somewhat variable, the active ingredient of the plants must be extracted into 600-700 parts by weight of water.

The extract liquor is filtered by a general filtering operation with a filter cloth to obtain filtrate which has a somewhat brown color and a pleasant aroma. When the volume of the extract liquor thus obtained is 600-700 parts by weight, the subsequent operation may be followed smoothly. If, however, the volume of the extract liquor is more than 600-700 parts by weight, it should be concentrated under a normal pressure or reduced pressure; while if the volume of the extract liquor is less than 600-700 parts by weight, then the overall volume of extract liquor should be adjusted to 600-700 parts by weight by addition of water.

The thus-prepared extract liquor is then added to an organic acid and lemon juice. As the said organic acid, citric acid, succinic acid, tartaric acid etc. either in a single or mixture form may be used. The proportion of the organic acid shall preferably be 10-25 parts by weight in respect of the extract liquor, and more particularly, an addition of 8-12 parts by weight of citric acid, 3.5-4.5 parts by weight of succinic acid and 3-4 parts by weight of tartaric acid provides an excellent product. Further, the proportion of lemon juice to be added shall preferably be 15-20 parts by weight in respect of the said extract liquor.

When the antiperspirant thus prepared is applied to a local part of the human body, the perspiration at the local part in the human body is suppressed and the offensive odor is perfectly removed. The durability of efficacy is about three to four days. The antiperspirant according to the invention may be prepared in paste, spray or liquid form.

EXAMPLE I 0.3 g. of flowers of Arabian jasmine, 6 g. of Chinese tea leaves, black or green, and 3 g. of seed of Chinese pepper are dipped in 300 ml. of water and boiled for twenty minutes so that the overall volume of liquor is reduced to approximately 180 ml. After cooling, the extract liquor is filtered off to obtain filtrate which is then added with 14 g. of citric acid, 6.3 g. of succinic acid, 5.4 g. of tartaric acid and with 27 ml. of lemon juice to prepare an antiperspirant.

EXAMPLE II 0.5 g. of flowers of Arabian jasmine, 7 g. of Chinese tea leaves, black or green, and 4 g. of seed of Chinese pepper are dipped in 200 ml. of water and subsequently subjected to a boiling reflux for 40 minutes. The extract liquor after cooling is filtered through filter cloth to obtain filtrate, which is subsequently added with 34 g. of citric acid, 9 g. of succinic acid and 40 ml. of lemon juice to prepare an antiperspirant.

EXAMPLE III 0.5 g. of flowers of Arabian jasmine, 7 g. of Chinese tea leaves, black or green, and 4 g. of seed of Chinese pepper are dipped in 200 ml. of ether and boiled at about 45° C. until the said ether is completely evaporated thereby obtaining a residue thereof. The resulting residue is added with alcohol and filtered to obtain the filtrate which is thereafter added with 34 g. of citric acid, 9 g. of succinic acid and with 40 ml. of lemon juice to prepare an antiperspirant.

It will be understood that the invention is not to be limited to the exact examples described, but that various changes and modifications may be made without departing from the spirit and scope of the invention, as defined in the appended claims.

Having described my invention, I claim:

1. A process for manufacturing an antiperspirant, comprising boiling a mixture of 1 to 2 parts by weight of well-dried flowers of Arabian jasmine, about 20 to 40 parts by weight of Chinese beverage tea leaves and about 10 to 20 parts by weight of seed of Chinese pepper with about 600 to 700 parts by weight of a liquid selected from the group consisting of water and ether for about 15 minutes to about one hour and filtering the extract liquor from said mixture to obtain a filtrate, adding to said filtrate an organic acid selected from the group consisting of about 8 to 12 parts by weight of citric acid, about 3.5 to 4.5 parts by weight of succinic acid and about 3 to 4 parts by weight of tartaric acid and thereafter adding to said filtrate about 15 to 20 parts by weight of lemon juice.

2. The process of claim 1 wherein when said liquid is ether the boiling mixture is evaporated to dryness and the residue reconstituted with alcohol prior to said filtering step.

3. The process of claim 1 wherein said liquid is water.

References Cited

UNITED STATES PATENTS 2,230,084    1/1941    Montenier _____ 424—65 X

OTHER REFERENCES

Harry: Modern Cosmeticology, pp. 125–26, Chem. Pub. Co., Brooklyn, N.Y., 1940.

Sagarin: Cosmetics, Science and Technology, p. 827, Interscience Pub., Inc., N.Y., 1957.

The U.S. Dispensatory, 23rd ed., pp. 1553–54, 1943.

Lyman et al.: American Pharmacy, Text of Pharm. Principles, Proc. and Preps., 4th ed., pp. 156–57, 160–161, 1955.

Steinmetz: Codex Vegetabitis, 2nd ed., Item 848, 1957.

ALBERT T. MEYERS, Primary Examiner

D. MOYER, Assistant Examiner

U.S. Cl. X.R.

424—195